United States Patent
Perri et al.

(10) Patent No.: US 7,397,372 B2
(45) Date of Patent: Jul. 8, 2008

(54) METHOD AND APPARATUS FOR MARKETING RETAIL GOODS

(75) Inventors: Robert A. Perri, Bartlett, IL (US); Timothy J. Collins, Homer Glen, IL (US); Daniel R. Gamota, Palatine, IL (US); Krishna Jonnalagadda, Algonquin, IL (US); Krishna Kalyanasundaram, Elmhurst, IL (US); Richard Rachwalski, Lemont, IL (US)

(73) Assignee: Motorola, Inc., Schaumburg, IL (US)

( * ) Notice: Subject to any disclaimer, the term of this patent is extended or adjusted under 35 U.S.C. 154(b) by 174 days.

(21) Appl. No.: 11/275,302

(22) Filed: Dec. 22, 2005

(65) Prior Publication Data

US 2007/0150331 A1    Jun. 28, 2007

(51) Int. Cl.
G08B 13/26    (2006.01)

(52) U.S. Cl. .................. 340/562; 340/572.1; 340/568.1; 705/10

(58) Field of Classification Search .............. None
See application file for complete search history.

(56) References Cited

U.S. PATENT DOCUMENTS

| | | | |
|---|---|---|---|
| 6,204,764 B1 * | 3/2001 | Maloney ................. | 340/568.1 |
| 6,236,316 B1 * | 5/2001 | Eberhardt et al. ........ | 340/572.7 |
| 6,282,407 B1 * | 8/2001 | Vega et al. ................. | 455/41.1 |
| 6,283,377 B1 * | 9/2001 | Takuma ..................... | 235/492 |
| 6,407,665 B2 | 6/2002 | Maloney | |
| 6,476,708 B1 | 11/2002 | Johnson | |
| 6,587,835 B1 | 7/2003 | Treyz et al. | |
| 6,642,837 B1 * | 11/2003 | Vigoda et al. ............. | 340/10.1 |
| 6,650,126 B1 * | 11/2003 | Indihar ....................... | 324/658 |
| 7,152,040 B1 * | 12/2006 | Hawthorne et al. ........... | 705/16 |
| 7,250,865 B2 * | 7/2007 | Maloney .................. | 340/572.1 |
| 2003/0055707 A1 * | 3/2003 | Busche et al. ................. | 705/10 |
| 2004/0044580 A1 * | 3/2004 | Haller ......................... | 705/17 |
| 2005/0200476 A1 * | 9/2005 | Forr et al. .............. | 340/539.13 |

* cited by examiner

*Primary Examiner*—Benjamin C. Lee
*Assistant Examiner*—Son Tang

(57) ABSTRACT

Merchandising and marketing data collection systems (100, 400, 500, 700, 1200, 1300, 1400, 1500) collect data on shopper's (816) interaction with merchandise samples (106, 414, 1212, 1400, 1502), page store personnel, output promotional vouchers and use the merchandise samples to access information about the capabilities of the merchandise being sold.

12 Claims, 13 Drawing Sheets

METHOD AND APPARATUS FOR MARKETING RETAIL GOODS

FIELD OF THE INVENTION

The present invention relates generally to systems and methods for merchandizing goods.

BACKGROUND

The general trend of technological progress has brought an ever increasing number of goods to the marketplace. Furthermore, globalization of markets has increased the number of companies vying for each product market and, consequently, the number of choices available to the consumer. In many sectors such as consumer electronics new functionality is added at such a rapid rate that most consumers are unable to maintain a high level of awareness and understanding of available features. Shortened product life cycles also make it difficult to stay abreast of new product developments. In the case of consumer electronics, the use of programmed microprocessors in electronics fosters introduction of new features at such a rapid rate that consumers can not easily keep pace with what is available to them.

Retailers often employ a part time and/or transient work force and are unable to provide intensive training on the variety of features offered by the myriad of goods that they sell. Thus, when a consumer, enters a brick and mortar retailer in the global market place he or she is often confounded by the myriad of choices and lack of available information or knowledgeable assistance.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
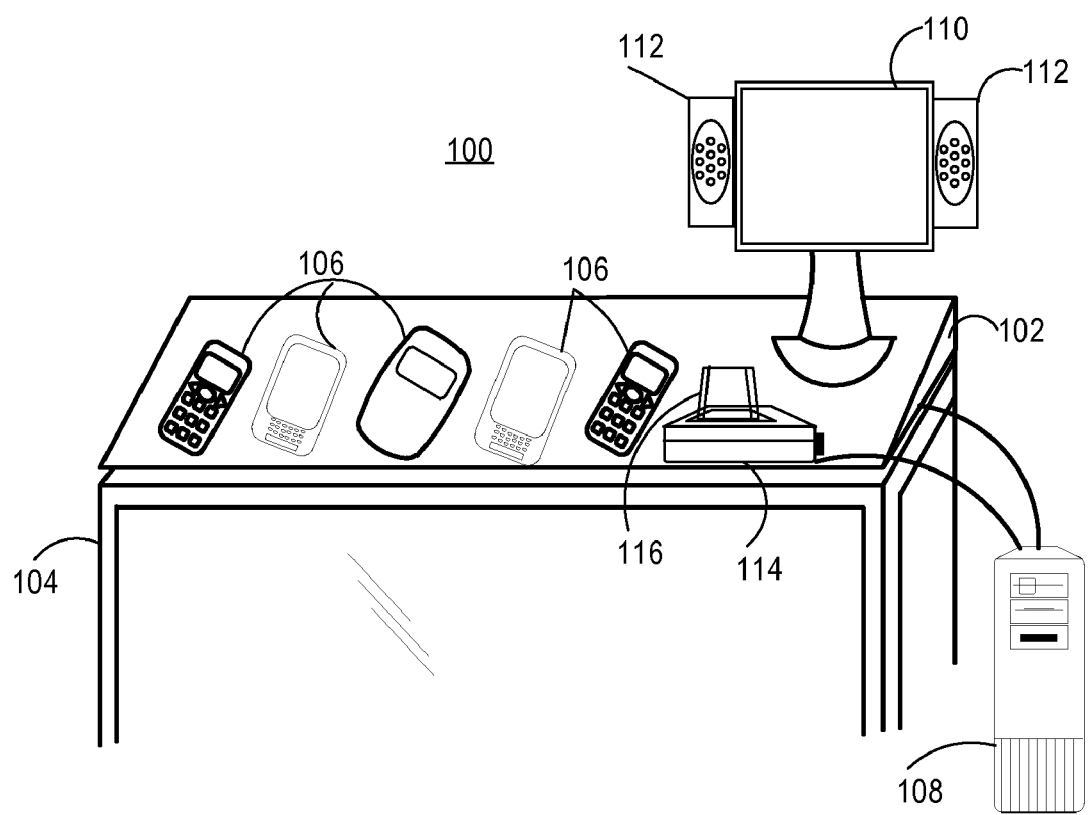
FIG. 1 is a marketing information collection and merchandizing system according to an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to marketing and merchandising systems. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of marketing information collection and merchandising described herein. The non-processor circuits may include, but are not limited to, a radio receiver, a radio transmitter, signal drivers, clock circuits, power source circuits, and user input devices. As such, these functions may be interpreted as steps of a method to perform marketing information collection and merchandising. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Figure 2:
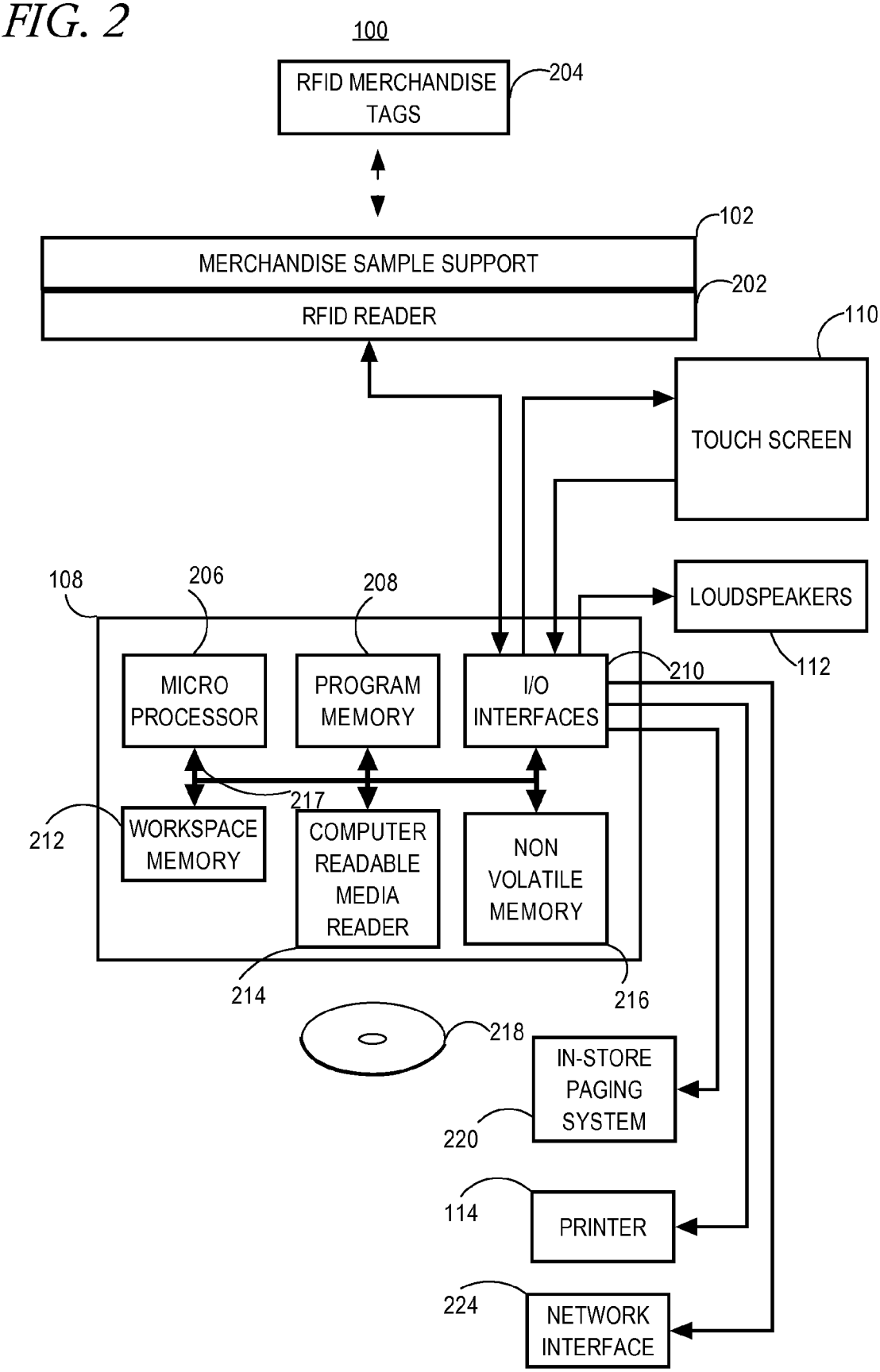
FIG. 2 is a block diagram of the marketing information collection and merchandizing system shown in FIG. 1 according to an embodiment of the invention.

FIG. 1 is a marketing information collection and merchandising system 100 according to an embodiment of the invention and FIG. 2 is a block diagram of the marketing information collection and merchandising system 100 shown in FIG. 1 according to an embodiment of the invention. The system 100 comprises a support in the form of a shelf 102 into which is integrated an RFID reader 202. The RFID reader 202 can use capacitive coupling, inductive coupling, or coupling through short-range propagating radio waves. As shown in FIG. 1 the shelf 102 is disposed atop a display case 104. Several merchandise samples 106 are placed on the shelf 102. Each merchandise sample 106 is provided with an RFID tag 204, which is enclosed in the sample 106 or affixed to the sample 106 by adhesive or other methods.

The RFID reader 202 is coupled to a computer 108 which receives information from the RFID reader 202. The computer 108 includes a microprocessor 206, a program memory 208, a set of input/output (I/O) interfaces 210, a workspace memory 212, a computer readable media reader 214 (e.g., optical disk drive), and a non-volatile memory 216 (e.g., hard disk) coupled together by a signal bus 217. The RFID reader 202 is coupled to the I/O interfaces 210. The computer 108 is also coupled to a touch screen 110, a set of loudspeakers 112 and an in-store paging system 220 and a printer 114. The printer 114 can be used to print out promotional vouchers 116 in response to users' interaction with the system 100. The computer 108 is also coupled to a network interface 224 (e.g., MODEM, Ethernet card). The network interface 224 can be used to load software for operating the system 100, for uploading marketing data collected by the system 100 to a remote server, and for downloading promotional offer information (e.g., sale prices, models covered, and/or graphics for printed promotional offer coupons).

Figure 3:
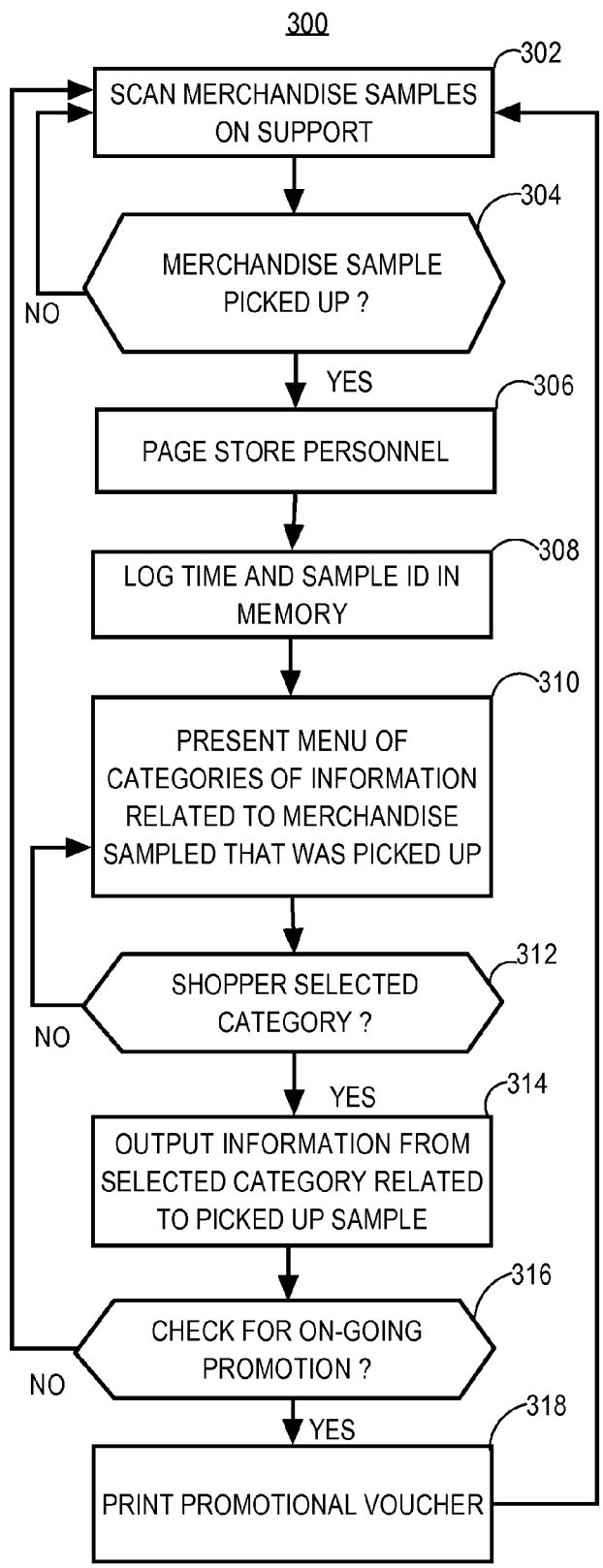
FIG. 3 is a partial flowchart of software for the marketing information collection and merchandising system shown in FIGS. 1, 2, 4, 5, 12 and 13.

FIG. 3 is a partial flowchart 300 of software for the marketing information collection and merchandising system 100 shown in FIGS. 1 and 2. In block 302 the merchandise samples 106 are scanned to detect their presence or removal from the shelf 102. Scanning by the reader 202 may be continuous or periodic. Block 304 is a decision block the outcome of which depends on whether the reader 202 detects that a particular merchandise sample 106 has been picked up. When a merchandise sample 106 has been picked up, in block 306 the in-store paging system 220 is used to page store personnel. Thus, store personnel who may be occupied elsewhere will be automatically notified that a shopper is perusing the merchandise samples 106.

In block 308, the time and/or identification number (ID) of the sample that was picked up is logged in the computer 108. Note that the RFID tag 204 for each merchandise sample 106 is unique. Data about the frequency that each merchandise sample is picked up is useful as marketing data. The data can be used to gauge consumers response to particular merchandise in general and also to gauge the effectiveness of advertising campaigns, etc.

In block 310 a menu of categories of information related to the merchandise sample that was picked up is presented to the shopper on the touch screen 110. Simultaneous with block 310 an audio message giving product information may also be output through the loudspeakers 112. Block 312 is decision block that depends on whether the shopper has selected a category presented in the menu. When a category is selected, the flowchart 300 branches to block 314 in which information related to the merchandise sample that was picked up, from the category selected from the menu, is output through the touchscreen 110 and/or loudspeakers 112. Decision block 316 tests if there is an on-going promotional voucher program for the merchandise sample that was picked up. If the outcome of block 316 is positive then in block 318 a promotional voucher is printed on the printer 114. If not, the flowchart returns to block 302 to await further shopper activity. Information as to promotional programs can be downloaded from a remote server (e.g., 1510, FIG. 15). Alternatively, discount information can simply be display on the touch screen 110.

Rather than presenting only one menu, the menu that is presented in block 310 may be one menu of a hierarchical menu system can be navigated using the touchscreen 110. A hierarchical menu system can be used to organize information about many features of the merchandise by category and subcategory. In addition to presenting a menu, a promotional offer may be presented on the touchscreen 110.

Software according to the flowchart shown in FIG. 3 can be stored on an optical disk 218 computer readable medium prior to being loaded onto the computer 108 via the computer readable medium reader 214. Alternatively, the software can be downloaded from a remote server (e.g., 1510, FIG. 5) via the network interface 224.

Figure 4:
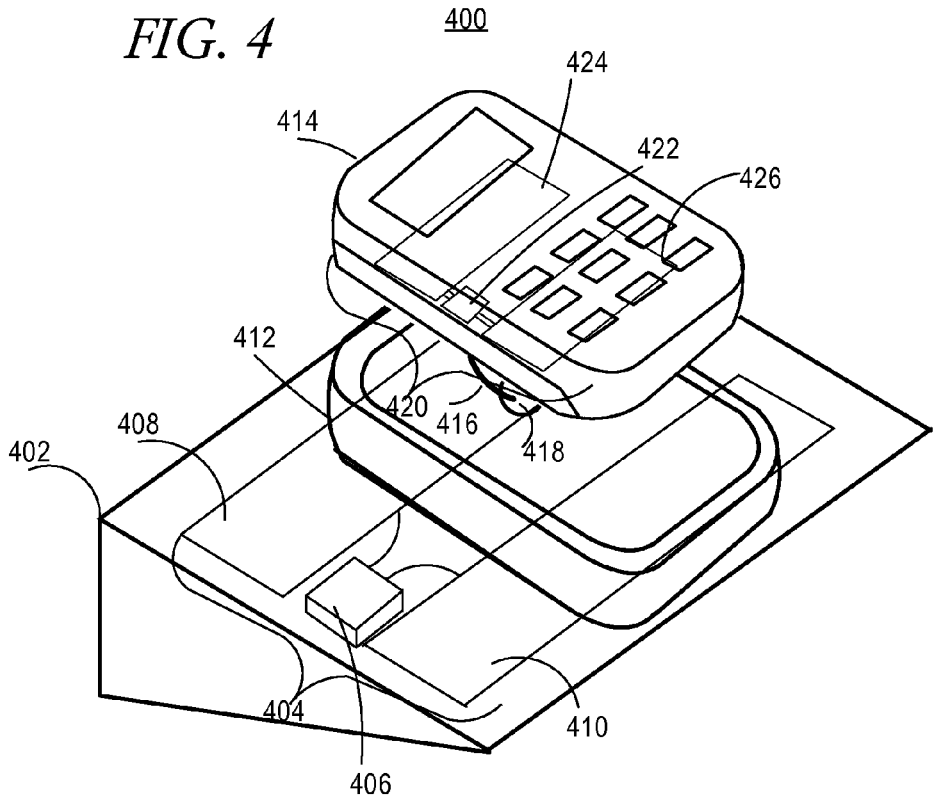
FIG. 4 is a partial x-ray view of a marketing information collection and merchandising system according to another embodiment of the invention.

FIG. 4 is a partial x-ray view of a marketing information collection and merchandizing system 400 according to another embodiment of the invention. The system 400 includes a support shelf 402 with integrated dipole capacitive RFID reader 404. The dipole capacitive RFID reader 404 includes an RFID reader integrated circuit 406 coupled between a first electrode 408 and a second electrode 410. A merchandise sample holder 412 is supported on the support shelf 402. A merchandise sample 414 fits into the sample holder 412. A tether 416 extends from the merchandise sample 414 into a hole 418 in the sample holder 412. A capacitive RFID tag 420 is located inside the merchandise sample 414. The capacitive RFID tag 420 can be located in a battery compartment of the merchandise sample 414. The capacitive RFID tag 420 includes an RFID tag integrated circuit 422 coupled between a third electrode 424 and a fourth electrode 426. When the merchandise sample 414 is located in the holder 412, the third electrode 424 is located closer to the first electrode 408 of the reader 404 and the fourth electrode 426 is located closer to the second electrode 410 of the reader 404. Differential signals are coupled between the first and second electrodes 408, 410 of the reader 404 and the third and fourth electrodes 424, 426 of the tag 420. The RFID reader 404 is able to detect when the merchandise sample 414 is removed from the holder 412. Detection may be accomplished by detecting no signal returned from the tag 420 or detecting a signal strength below a predetermined threshold.

Figure 5:
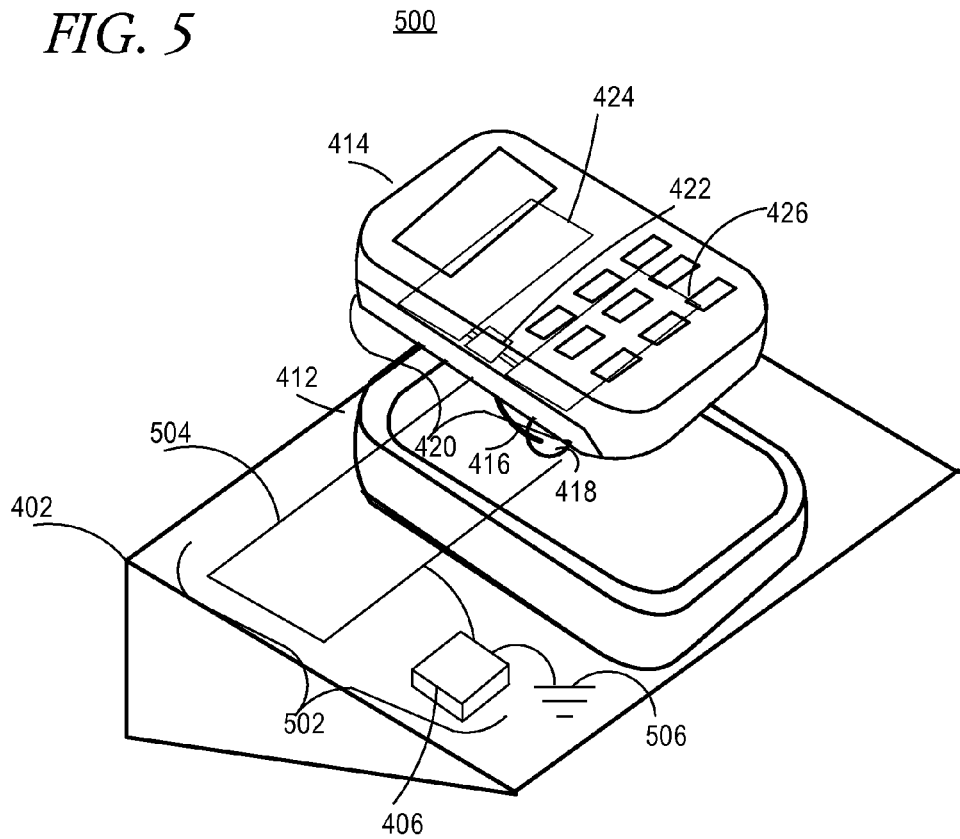
FIG. 5 is a partial x-ray view of a marketing information collection and merchandising system according to yet another embodiment of the invention.

FIG. 5 is a partial x-ray view of a marketing information collection and merchandizing system 500 according to yet another embodiment of the invention. The system 500 shown in FIG. 5 differs from the system 400 shown in FIG. 4 in that instead of the dipole RFID reader 404 a monopole capacitive RFID reader 502 in which the RFID reader IC 406 is coupled between a single read electrode 504 and ground 506 is utilized. In the system 500 shown in FIG. 5, when a shopper's hand is placed on the merchandise sample 414 a circuit through ground is completed allowing the RFID reader 502 to read the RFID tag 420.

Figure 6:
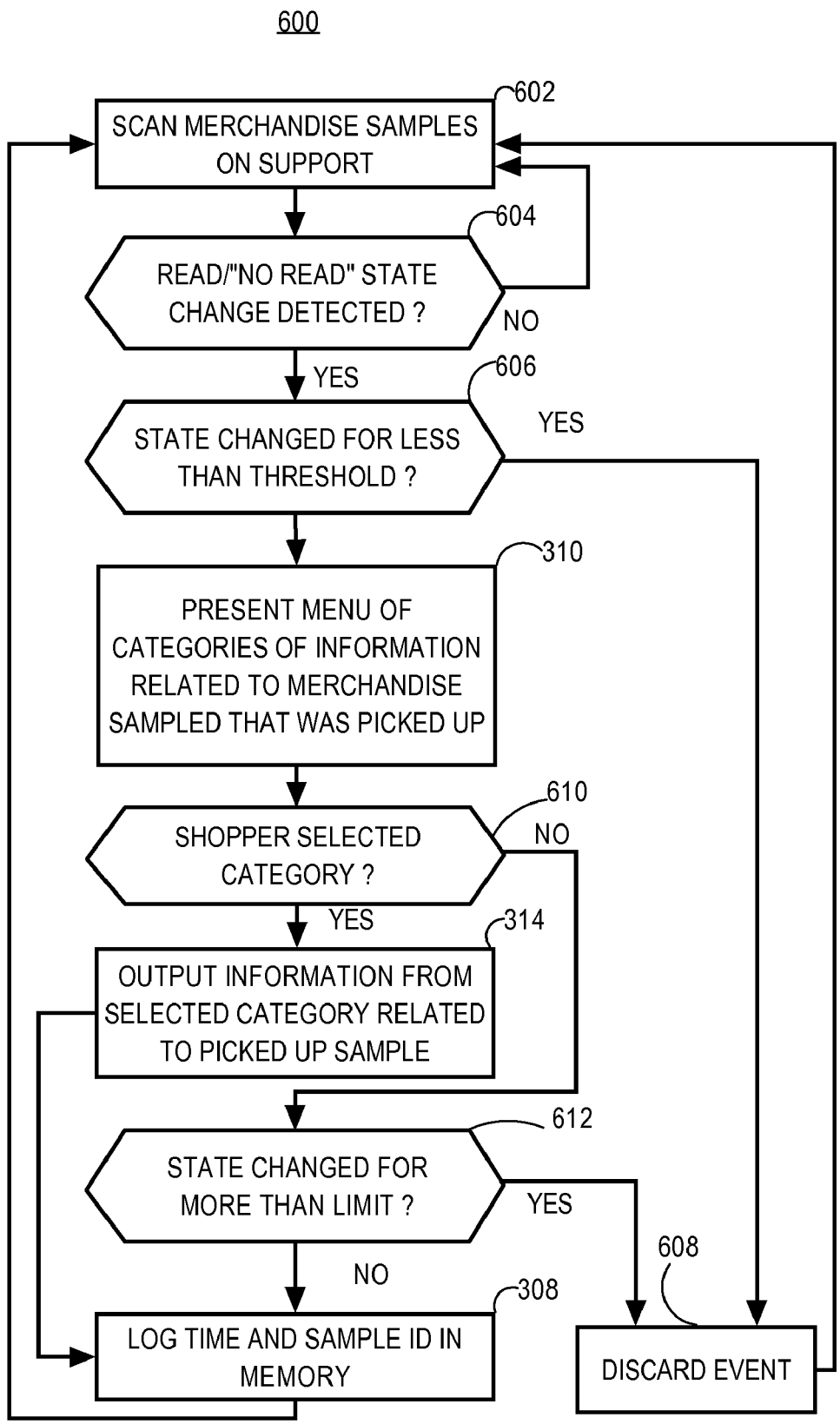
FIG. 6 is a partial flowchart of software for the marketing information collection and merchandising system shown in FIGS. 1, 2, 4, 5, 12 and 13.

FIG. 6 is a partial flowchart 600 of software for the marketing information collection and merchandising system shown in FIGS. 1, 2, 4, 5, 12 and 13. The flowchart 600 shown in FIG. 6 includes steps for filtering out spurious reader signals. Spurious reader signals can occur if one of the merchandise samples is inadvertently or randomly tapped (e.g., by an adolescent playing with the merchandise samples). Spurious reader signals can also occur if a merchandise sample (e.g., 414, in the case of system 500) is placed near a ground object (e.g., a metal frame of the display case 104), simulating the condition of a shopper's hand positioned on the merchandise sample. The software shown in FIG. 6 serves to reduce spurious signals by applying duration criteria.

In block 602 the merchandise samples 106 are scanned to detect their presence or removal (e.g., from shelf 102, or holder 402). Scanning by the reader may be continuous or periodic. Decision block 604 depends on whether a change in a state of an RFID reader between a state in which a tag is readable and a state in which the tag is not readable occurs. Note that whether or not a merchandise tag is readable when there is no user interaction with the merchandise samples depends on the design of the system, for example, in the case of the system shown in FIG. 4 when the merchandise sample 414 is in the holder 414, the electrodes 408, 410 of the reader 404 and the electrodes 424, 426 of the tag 420 will be well coupled allowing the tag 420 to be read and when a shopper removes the merchandise sample 414 a certain distance, the reader 404 will not be able to read the tag 420. On the other hand, in the case of the system 500 shown in FIG. a shopper placing a hand on the merchandise sample 414 allows the tag 420 to be read, and when the merchandise sample 414 is in the holder 412 with no hand present, the tag 420 can not be read.

Following block 604, decision block 606 tests if the state changed for less than a predetermined threshold duration. The predetermined threshold is set to distinguish the case that the merchandise sample was actually picked up from the case that the merchandise sample was inadvertently or randomly tapped. If the state changed for less than the predetermined threshold duration then in block 608 then the state change event is discarded. If, on the other hand, the duration for which the state remains changed has exceeded the predetermined threshold, then block 310 which is common with the flowchart 300 shown in FIG. 3 is executed. Thereafter decision block 610 is reached. Block 610 tests if a shopper has selected a category on the menu presented in block 310. When a category is selected, block 314 is executed. If a category is not selected, the flowchart 600 branches to block 612 which tests if the read/"no read" state that was detected in block 604 has persisted for more than a predetermined limit. The predetermined limit is set to distinguish the case of a shopper picking up and holding the merchandise sample from the case of the merchandise sample merely being moved to a position that simulates user interaction (e.g., away from the reader 404 in the case of system 400, or close to a metal object in the case of the system 500). If the new state persists for more than the predetermined limit, then the flowchart 600 branches to block 608 in which the state change event is discarded. The predetermined threshold suitably has a value in the range of 1 to 5 seconds. The predetermined limit suitably has a value in the range of 5 to 10 minutes.

In the case that the shopper selected a category after executing block 314 the flowchart 600 proceeds to block 308. Also in the case that shopper did not select a category, if the predetermined limit was not exceeded, after block 612 the flowchart 600 also proceeds to block 308, in which the time and ID of the merchandise sample that was handled is logged.

Figure 7:
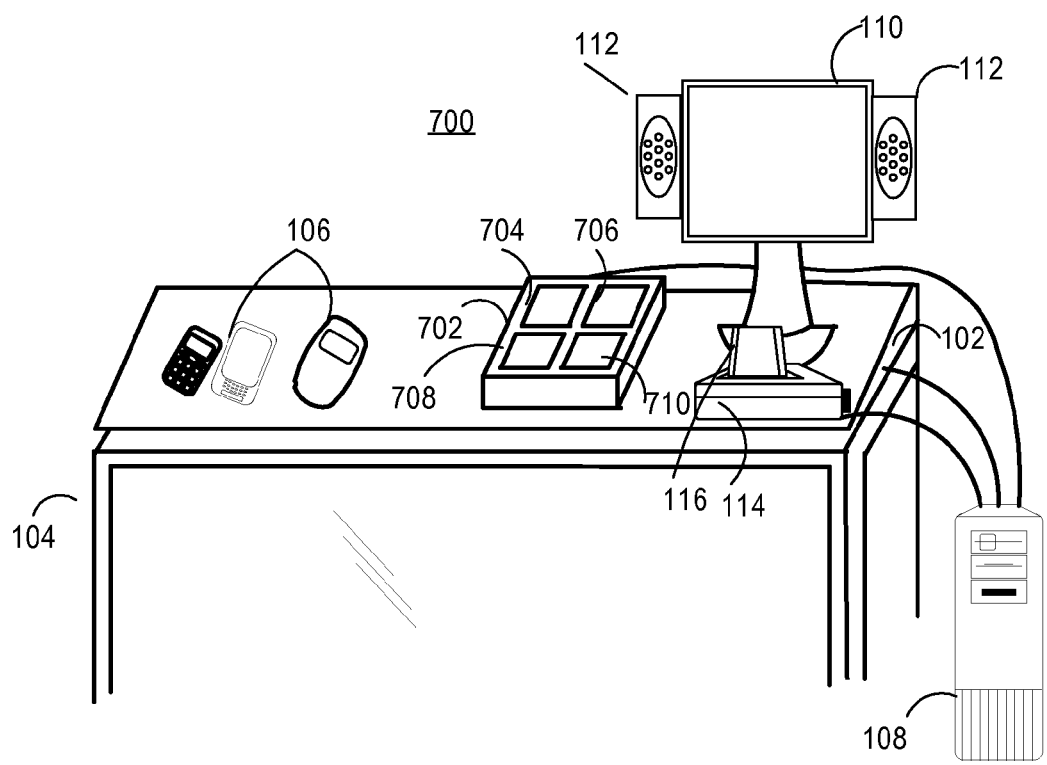
FIG. 7 is a marketing information collection and merchandising system in according to another embodiment of the invention.
Figure 8:
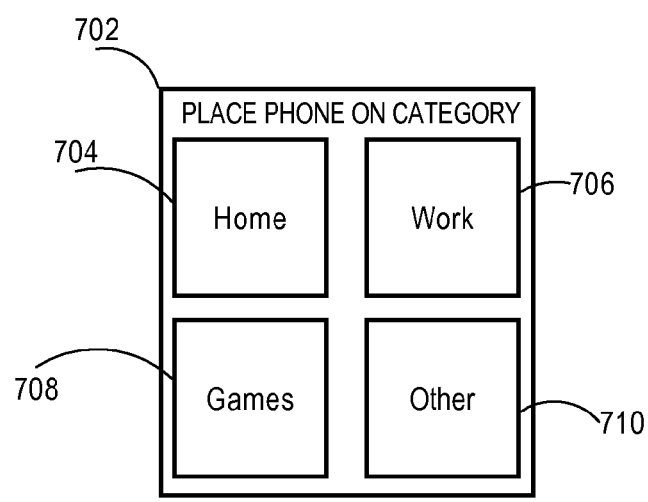
FIG. 8 is a top view of a user-friendly interface input of the marketing information collection and merchandising system shown in FIG. 7.
Figure 9:
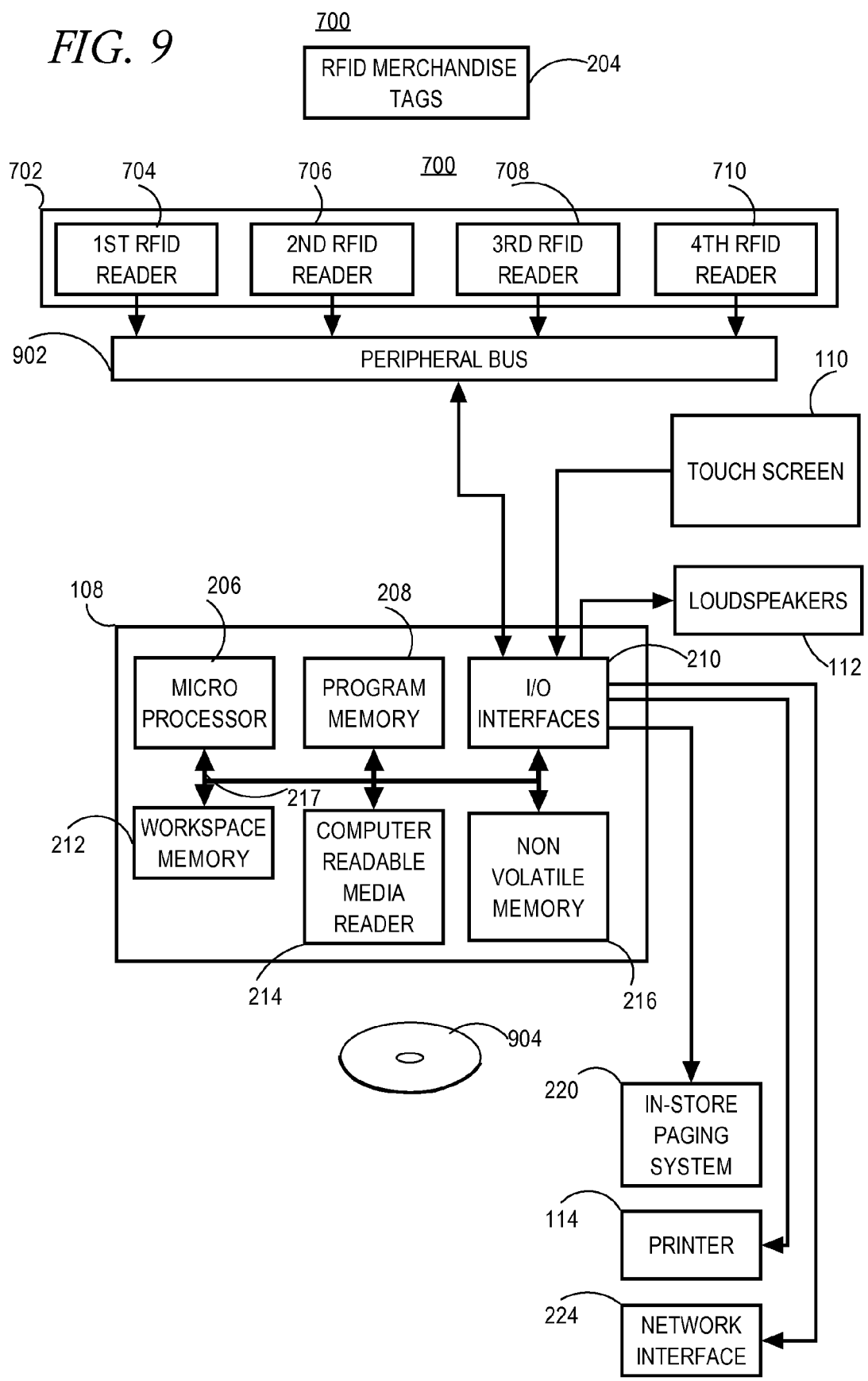
FIG. 9 is a block diagram of the marketing information collection and merchandising system shown in FIG. 7 according to an embodiment of the invention.

FIG. 7 is a merchandising system 700 according to another embodiment of the invention, FIG. 8 is a top view of a user-friendly interface of the merchandising system 700 shown in FIG. 7, and FIG. 9 is a block diagram of the merchandising system 700 shown in FIG. 7 according to an embodiment of the invention. In addition to the parts in common with the system 100 the merchandising system 700 shown in FIG. 7 comprises a user selection input device 702 that includes a set of RFID readers 704, 706, 708, 710 (e.g., capacitive RFID readers) each of which includes a read antenna and each of which is labeled with a category selection (e.g., "Home", "Work", "Games", "Other"). A shopper effects a selection of one of the categories of information by holding one of the merchandise samples 106 (with its attached RFID tag 204) up to one of the RFID readers 704, 706, 708, 710. The user selection input device 702 is user-friendly and encourages consumer interest in the merchandise samples 106. As shown in FIG. 6 the RFID readers 704, 706, 708, 710 are suitably coupled to a common peripheral bus, (e.g., a Universal Serial Bus) 902, which is in turn coupled to the I/O interfaces 210 of the computer 108. Another computer readable medium 904 is provided for loading software onto the computer 108 for configuring the computer to operate the merchandising system 700.

Figure 10:
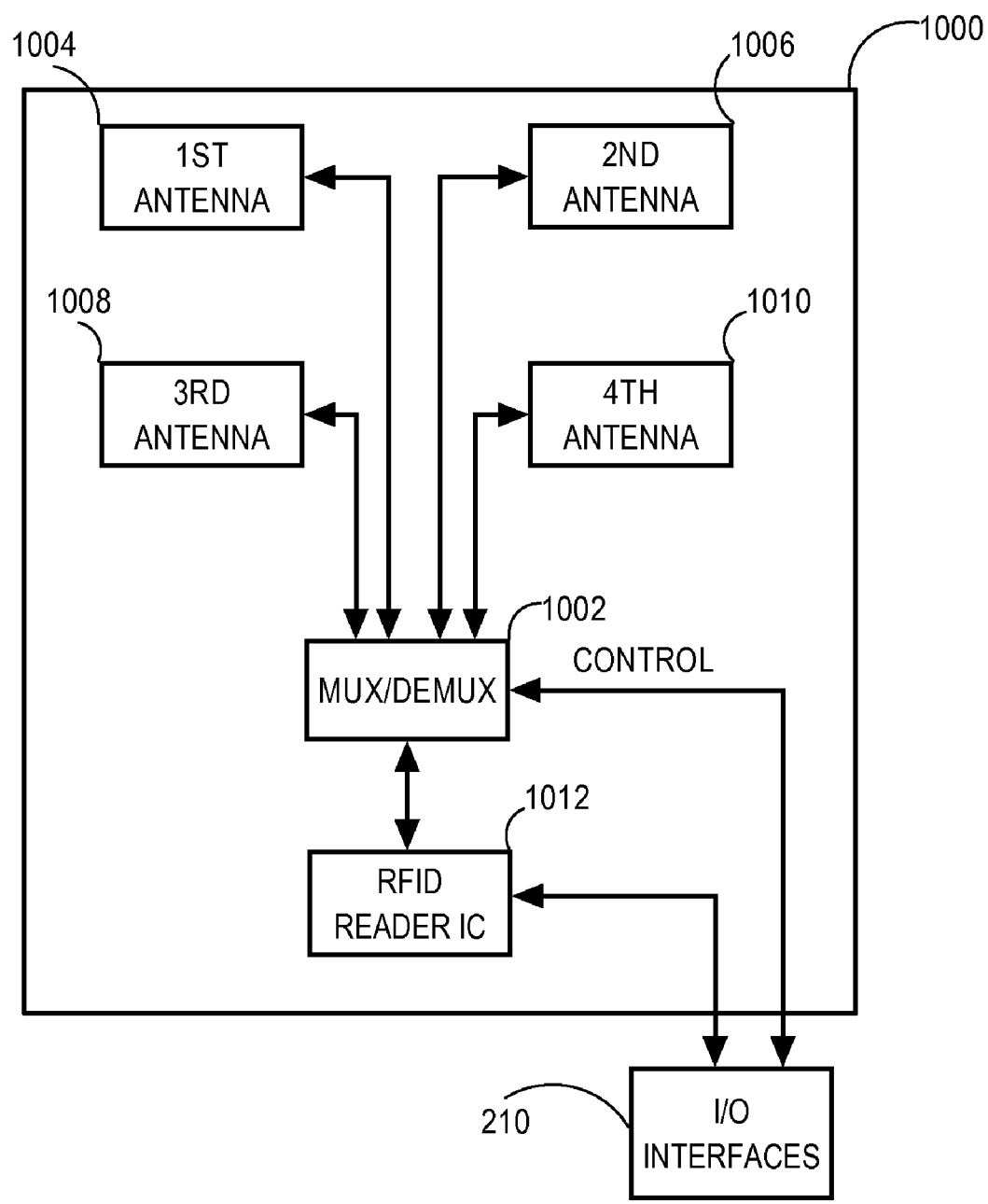
FIG. 10 is a partial block diagram including an alternative user friendly interface for use in the system shown in FIG. 7-9.

FIG. 10 is a partial block diagram including an alternative user friendly interface 1000 for use in the system shown in FIG. 7-9. Rather than using four separate RFID readers each with a separate read antenna, the interface 1000 uses a multiplexer/demultiplexer 1002 to sequentially couple one of four antennas 1004, 1006, 1008, 1010 to a single RFID reader integrated circuit 1012. The RFID reader integrated circuit 1012 and the multiplexer/demultiplexer 1002 are coupled to the I/O interfaces 210. In this case, the microprocessor 206 is programmed to record the state of the multiplexer/demultiplexer 1002 and thus which of the four antennas 1004, 1006, 1008, 1010 is active when one of the RFID item tags 204 is read.

Figure 11:
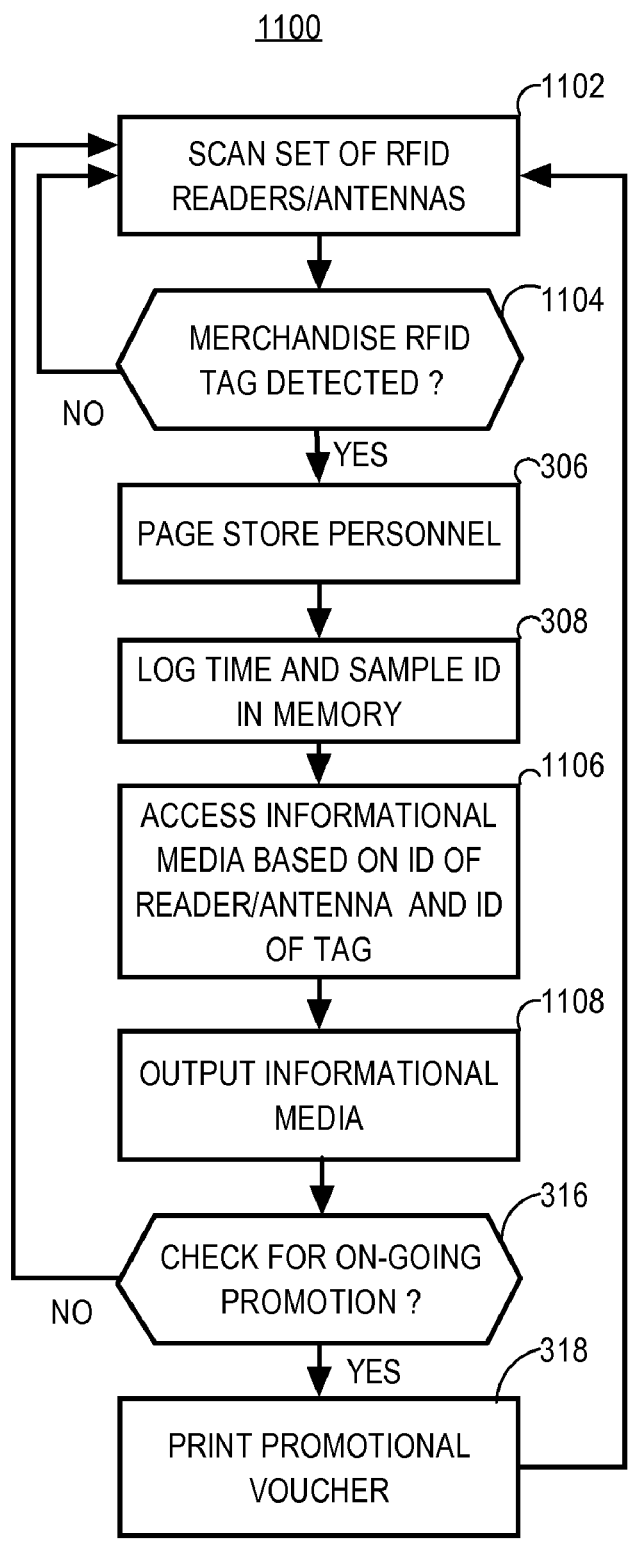
FIG. 11 is a partial flowchart of software for the marketing information collection and merchandising systems shown in FIGS. 7-10.

FIG. 11 is a partial flowchart 1100 of software for the merchandising systems shown 700 in FIGS. 7-10. In block 1102 the set of RFID readers 704, 706, 708, 710 or antennas 1004, 1006, 1008, 1010 is scanned to determine if a merchandise sample 106 is being held up to one of the readers 704, 706, 708, 710 or antennas 1004, 1006, 1008, 1010. The following block 1104 is a decision block the outcome of which depends on whether one of the RFID tags 204 of a merchandise sample 106 has been detected. If so, then blocks 306, 308 which are in common with the flowchart 300 shown in FIG. 3 are executed. Thereafter, in block 1106 specific informational media that is related to the particular category of information corresponding to one of the readers 704, 706, 708, 710, or antennas 1004, 1006, 1008, 1010 which the merchandise sample 106 was held near and is related to the particular merchandise sample, which is identified by a unique RFID merchandise tag 204, is accessed. The informational media is suitably stored in the nonvolatile memory (e.g., hard disk) 216. In block 1108 the informational media is output. The informational media can include audio that is output through the loudspeakers 112 and video that is output on the touch screen 110. Thereafter, blocks 316, 318 which are in common with the flowchart 300 shown in FIG. 3 are executed.

Figure 12:
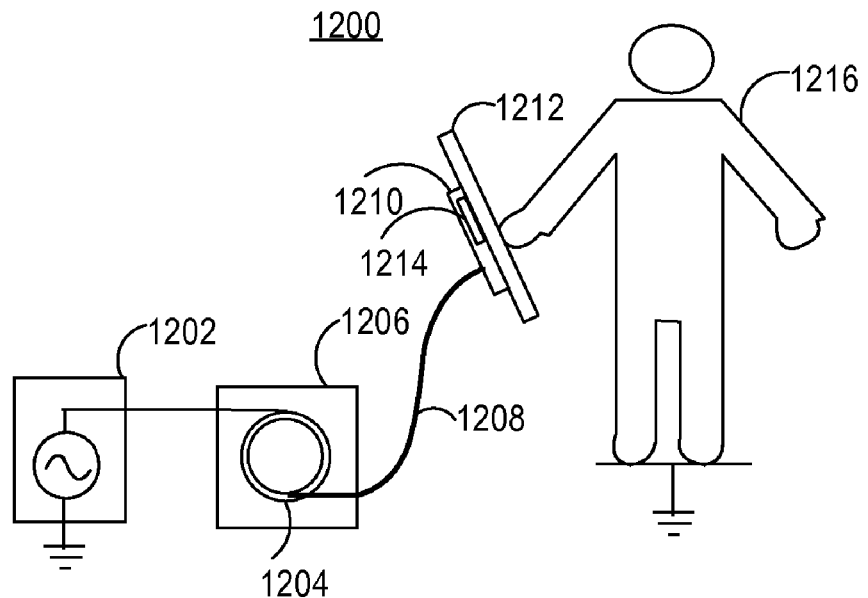
FIG. 12 is a schematic of a first marketing information collection and merchandising system that uses tether coupled RFID sensors.

FIG. 12 is a schematic of a first merchandising system 1200 that uses tether coupled RFID sensors. As shown in FIG. 12, a grounded capacitive RFID reader 1202 is electrically coupled to a spool 1204 of a merchandise tether retractor 1206. A tether 1208 extends from the retractor 1206 to a tether attachment 1210. The tether attachment 1210 is attached to a merchandise sample 1212. The tether attachment 1210 includes an RFID tag 1214. The RFID tag 1214 is electrically coupled through the tether 1208 to the RFID reader 1202. When a shopper 1216 touches the sample 1212, the shopper completes a circuit between the RFID tag 1214 and the RFID reader 1202, through ground, thereby allowing the RFID tag 1214 to be read. The RFID tag 1214 provides a unique ID for each merchandise sample 1212. Thus, the shopper's touching particular merchandise samples 1214 can be detected. The system 1200 provides another alternative to the RFID reader 202 used in the system 100 shown in FIGS. 1-2.

Figure 13:
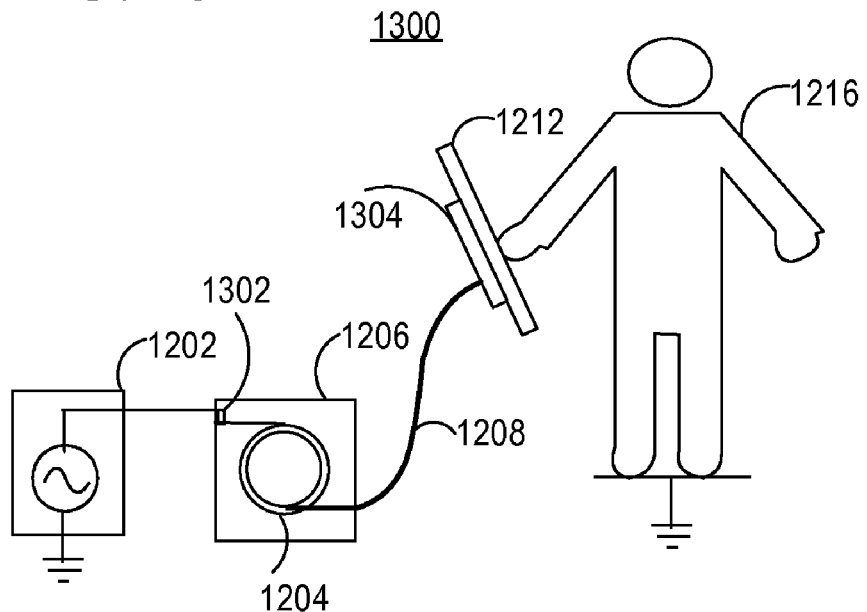
FIG. 13 is a schematic of a second marketing information collection and merchandising system that uses tether coupled RFID sensors.

FIG. 13 is a schematic of a second merchandising system 1300 that uses tether coupled RFID sensors. The system 1300 shown in FIG. 13 differs from the system 1200, in that rather than locating the RFID tag 1214 in the tether attachment, an RFID tag 1302 is electrically coupled between the spool 1204 and the RFID reader 1202, and a metal (or other conductive) tether attachment 1304 is used.

Figure 14:
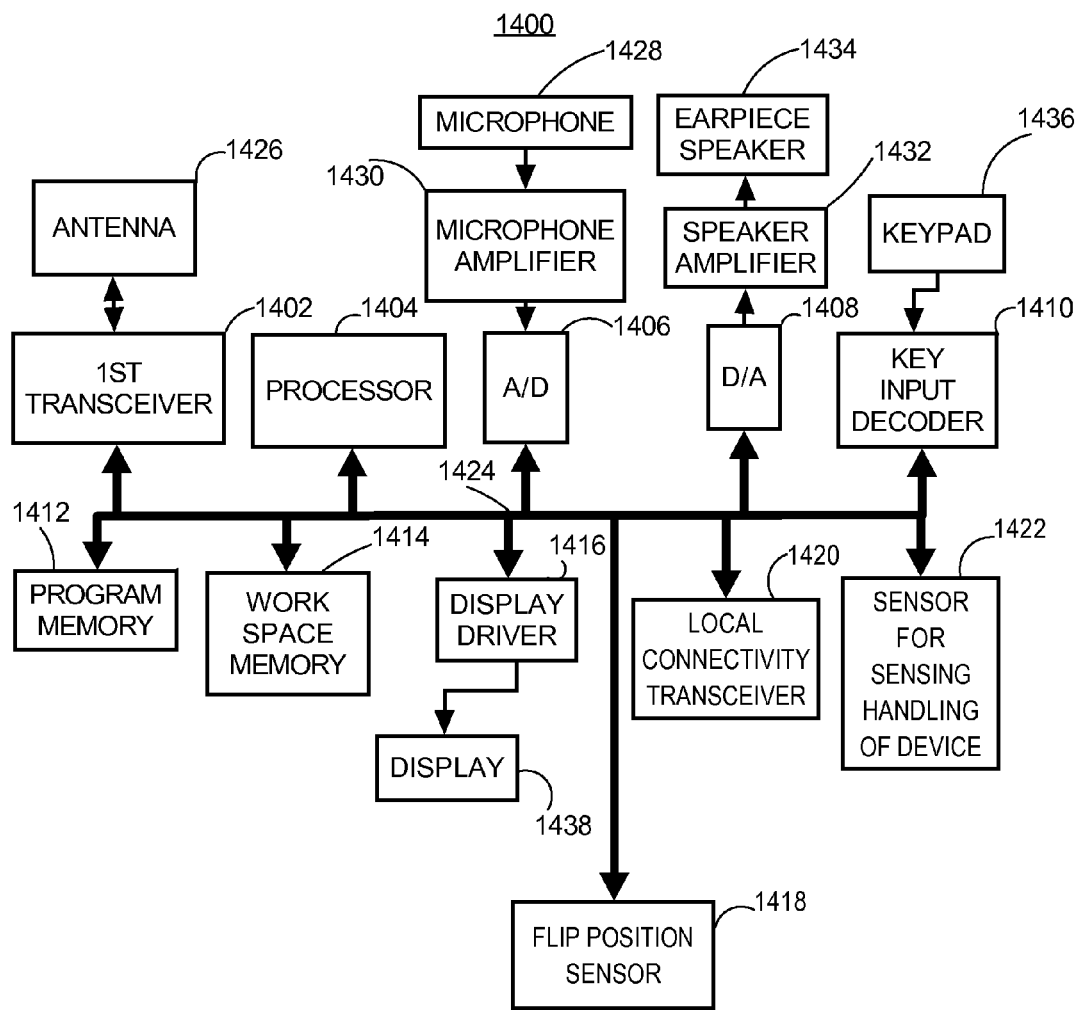
FIG. 14 is a block diagram of smart display model device for use in marketing information collection and merchandising systems according to certain embodiments of the invention.

FIG. 14 is a block diagram of smart display model 1400 of a wireless communication device for use in marketing and merchandising systems according to certain embodiments of the invention. As shown in FIG. 14, the display model 1400 comprises a first transceiver 1402, a processor 1404, an analog-to-digital converter (A/D) 1406, a digital-to-analog converter (D/A) 1408, a key input decoder 1410, a program memory 1412, a workspace memory 1414 a display driver 1416, a flip position sensor 1418, a local connectivity (e.g., Bluetooth, IRDA, RS232, USB) transceiver 1420, and a sensor 1422 for sensing handling of the device 1400 coupled together through a system bus 1424.

The first transceiver 1402 is coupled to an antenna 1426. Microwave or RF signals modulated with information pass between the transceiver 1402 and the antenna 1426.

The processor 1404 uses the workspace memory 1414 to execute control programs for the device 1400 that are stored in the program memory 1412. Control programs for the device 1400 are described below in more detail.

A microphone 1428 is coupled through a microphone amplifier 1430 to the A/D 1406. Spoken utterances are digitized by the A/D 1406 and made available to the processor 1404 (or a specialized processor, not shown) for audio encoding or speech recognition.

The D/A 1408 is coupled through a speaker amplifier 1432 to an earpiece speaker 1434. Digitally encoded audio, e.g. spoken words, are converted to analog form by the D/A 1408 and output through the speaker 1434.

The key input decoder 1410 is coupled to a keypad 1436. The key input decoder 1410 identifies depressed keys to the processor 1404. The display driver 1416 is coupled to a display 1438.

The display model 1400 can be used as a merchandise sample in a merchandizing and marketing data collection system. In such a system the sensor for sensing handling of the device 1422, the flip position sensor 1418 and the keypad 1436 can be used to collect data on shoppers' interaction with the display model 1400. The sensor for sensing handling of the device 1422 can comprise a capacitive RFID tag or a tilt switch, for example. If desired, one or more parts of the device 1400 shown in FIG. 14 that are not required display model functions can be eliminated.

Figure 15:
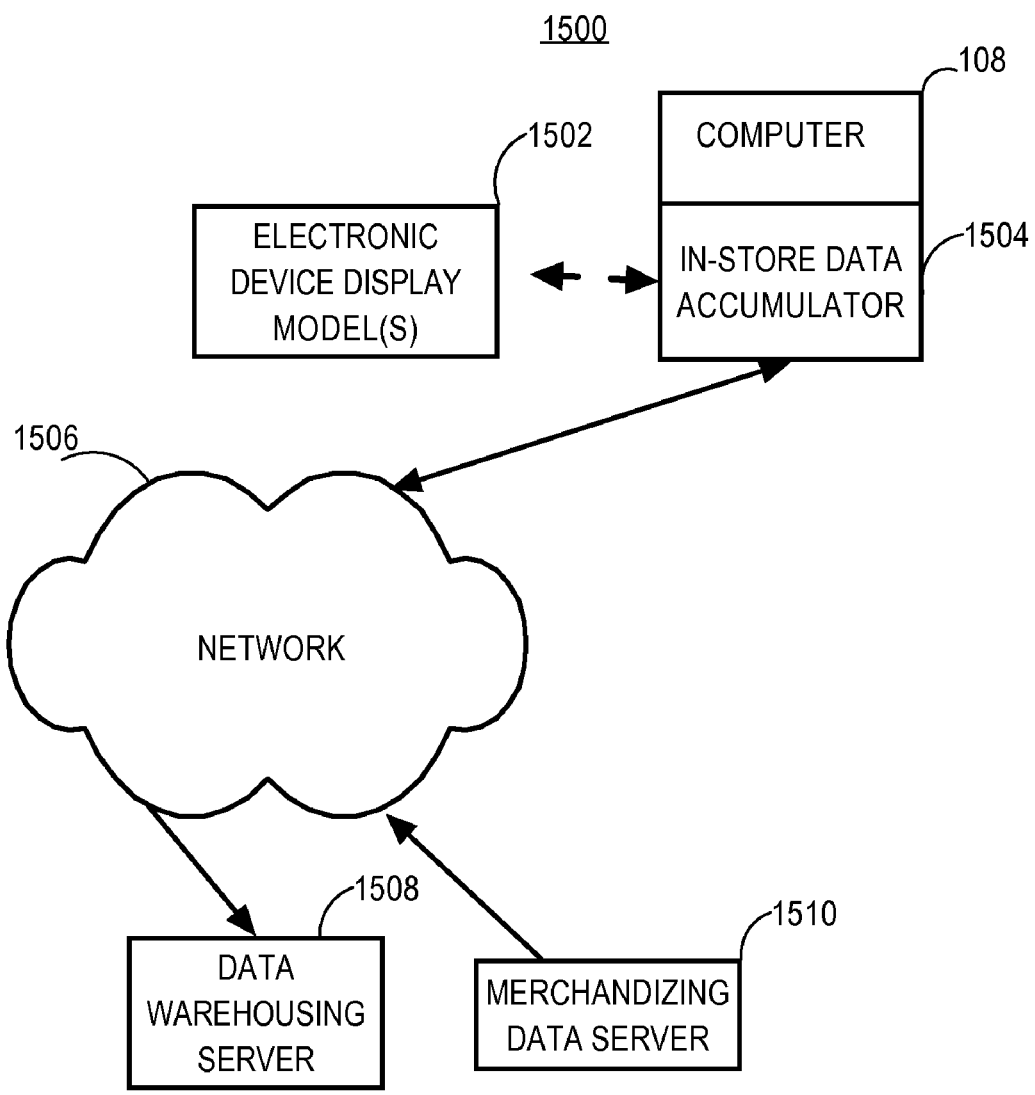
FIG. 15 is a diagram of a marketing data acquisition and merchandising system.

FIG. 15 is a diagram of a marketing data acquisition and merchandizing system 1500 that uses a smart display model 1502 such as, for example, the smart display model 1400 shown in FIG. 14. The system comprises one or more smart display models 1502, that are communicatively coupled (e.g., via an RFID protocol, Bluetooth, IRDA, RS232) to an in-store data accumulator 1504. The connection between the smart display models 1502 and the in-store data accumulator 1504 can be wireless or use a signal conduit (e.g., electrical conductors, optical fiber) that may be incorporated in a tether. The smart display models 1502 collect data on shopper's interaction with the display models and send the collected data to the in-store accumulator 1504. Data is transferred (pushed or pulled) through a network 1506 (e.g., the Internet), to a data warehousing server 1508. For further informational purposes, the data can be augmented with an identification of the store in which it is collected. Alternatively, the first transceiver 1402 is used to send the data to the data warehousing server 1508, without using the in-store accumulator 1504. In this case the smart display model 1400 can act as its own data accumulator, accumulating data for a period of time, (e.g., until an allocated buffer space in the work space memory 1414 becomes full) and then uploading the data (e.g., via a GPRS connection) to the data warehousing server 1508.

The data accumulated in the data warehousing server 1508 provides a valuable resource of marketing information that can be used to gauge consumer responses to new products and to marketing campaigns. A merchandising data server 1510 is also communicatively coupled to the computer 108 through the network 1506. Information that is used in merchandising including information about the merchandise that is output to shoppers and promotional offers is downloaded (pushed or pulled) to the computer 108, through the network 1506, from the merchandising data server 1510. Data can also be downloaded directly to the display model without going through the computer 108. The architecture shown in FIG. 15 is also applicable to the systems 100, 700, 1200, 1300 described above.

Figure 16:
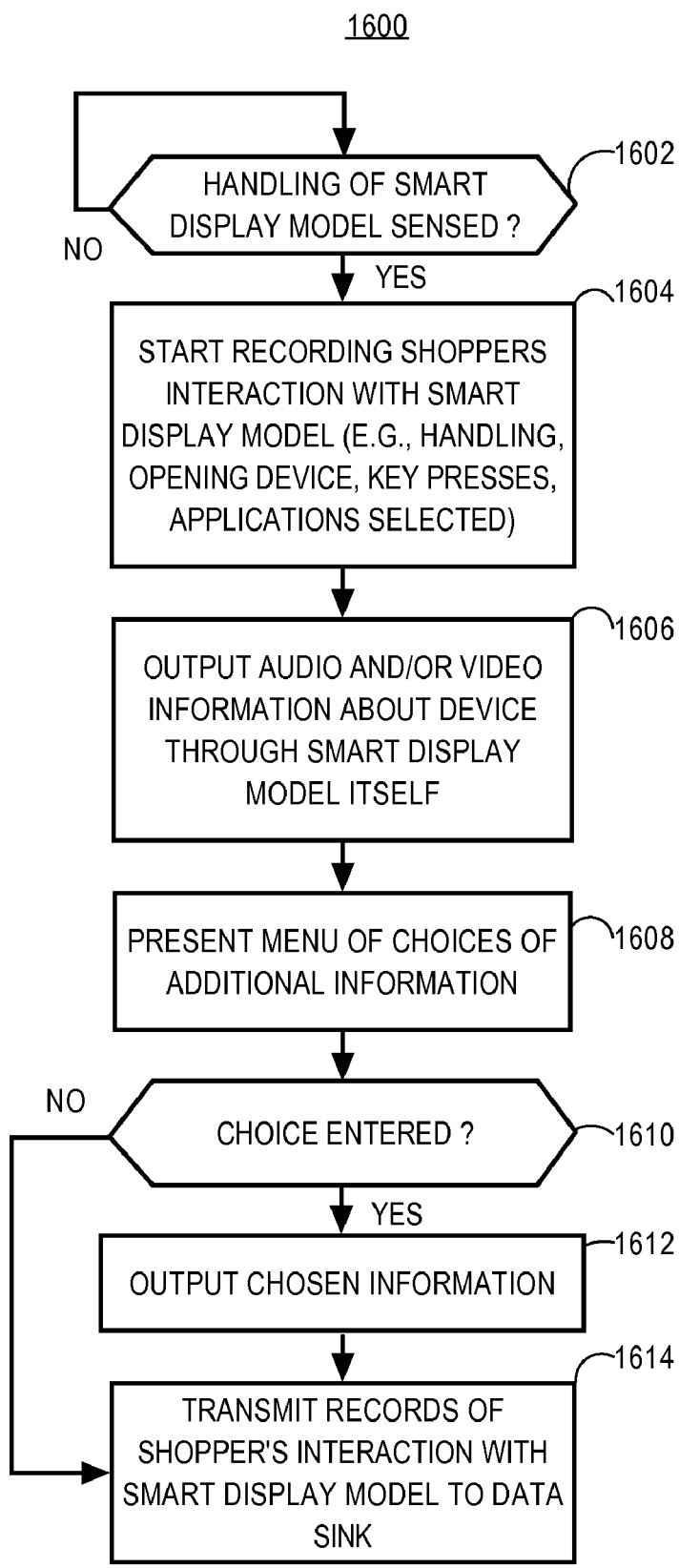
FIG. 16 is a flow chart of a merchandising and marketing data acquisition method according to an embodiment of the invention.

FIG. 16 is a flowchart 1600 of a merchandising and marketing data acquisition method according to an embodiment of the invention. In block 1602 handling of a smart display model (e.g., smart display model 1400) is sensed. Handling can be sensed by detecting operation of the controls (e.g., keys) or using a special sensor for sensing handling (e.g., 1422).

When handling is sensed the flowchart branches to block 1604 in which a shopper's interaction with the smart display model is recorded. The record made in block 1604 can include, by way of example, the duration of handling, information as to what controls were operated, what applications were accessed, and whether a flip or other part of the display model was opened.

In block 1606 audio and/or video information about the model is output through the smart display model itself. A screen and loudspeaker of the smart display model can be used to output information. In block 1608 a menu of choices of additional information is presented, e.g., on the screen of the display model. Decision block 1610 depends on whether a choice is entered. A choice may be entered by voice command or using a keypad of the display model, for example. The display model can also output voice prompts to elicit voice commands. If a choice of additional information is made, then in block 1612 the chosen additional information is output. The menu of choices may be a special informational menu for display models or an actual menu used in working models. If no choice is made the flowchart 1600 branches from decision block 1610 to block 1614

In block 1614 records of the shopper's interaction with the smart display model are transmitted to a data sink (e.g., in-store data accumulator 1504, data warehousing server 1508).

Embodiments of the invention can be applied to marketing and merchandising a variety of types of products including, by way of example, household goods, groceries, cameras, and hand tools.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A marketing system comprising:
   a support for supporting a merchandise sample;
   a sensor system for sensing a shopper's interaction with the merchandise sample; and
   an information system coupled to the sensor system, wherein the information system receives input from the sensor system, wherein the sensor system comprises: a capacitive RFID tag coupled to the merchandise sample and adapted to sense the shopper's touching the merchandise sample; and a capacitive RFID reader for reading the capacitive RFID tag, the sensor system further comprises a conductive tether coupled to the capacitive RFID tag and coupled to ground, through a shopper to allow the capacitive RFID tag to be read.

2. The marketing system according to claim 1 wherein:
   the information system comprises a data sink, for logging data about the shopper's interaction with the merchandise sample.

3. The marketing system according claim 1 wherein:
   the capacitive RFID tag comprises a first electrode and a second electrode.

4. The marketing system according to claim 3 wherein:
   the capacitive RFID reader comprises an RFID integrated circuit coupled between a single electrode and a ground.

5. The marketing system according to claim 1 wherein:
   the capacitive RFID reader comprises a third electrode and a fourth electrode.

6. The marketing system according to claim 1 wherein the sensor system comprises: a processor that is programmed to log the shopper's actuation of one or more controls of the merchandise sample and transmit information about the shopper's actuation of the one or more controls to the information system.

7. The marketing system according to claim 1 wherein the information system comprises an output for outputting information about the merchandise sample to the shopper in response to the sensor system sensing the shopper's interaction with the merchandise sample.

8. The marketing system according to claim 1 further comprising a printer coupled to the information system; and
   wherein the information system is adapted to selectively print a promotional offer on the printer in response to the shopper's interaction with the merchandise sample.

9. A marketing system comprising:
   a support for supporting a merchandise sample;
   a sensor system for sensing a shopper's interaction with the merchandise sample; and
   a communication system coupled to the sensor system, wherein the communication system is adapted to alert a salesperson in response to the shopper's interaction with the merchandise, sample wherein the sensor system comprises: a capacitive RFID tag coupled to the merchandise sample and adapted to sense the shopper's touching the merchandise sample; and a capacitive RFID reader for reading the capacitive RFID tag, the sensor system further comprises a conductive tether coupled to the capacitive RFID tag and coupled to ground, through a shopper to allow the capacitive RFID tag to be read.

10. The marketing system according to claim 9 wherein the communication system comprises a wireless paging system.

11. A marketing system electronic devices comprising:
    a demonstration model electronic device comprising:
       a sensor for sensing a shopper's interaction with the demonstration model;
       an information output; and
       a processor coupled to the sensor and the information output;
    wherein, the processor is programmed receive input from the sensor indicating the shopper's interaction with the demonstration model and output information through the information output, in response to the shopper's interaction, wherein the sensor system comprises: a capacitive RFID tag coupled to the demonstration model and adapted to sense the shopper's touching the demonstration model; and a capacitive RFID reader for reading the capacitive RFID tag, the sensor system further comprises a conductive tether coupled to the capacitive RFID tag and coupled to ground, through a shopper to allow the capacitive RFID tag to be read.

12. The system according to claim 11 wherein the information output comprises a display of the demonstration model.

\* \* \* \* \*